June 17, 1958 D. HOCHMAN 2,839,732
SINGLE-SIDEBAND FILTER
Filed Jan. 31, 1955 2 Sheets-Sheet 1
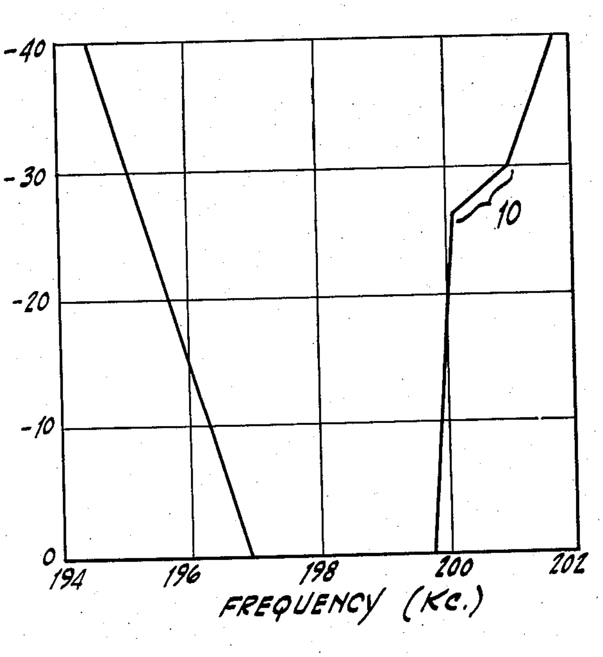
Fig. 1.
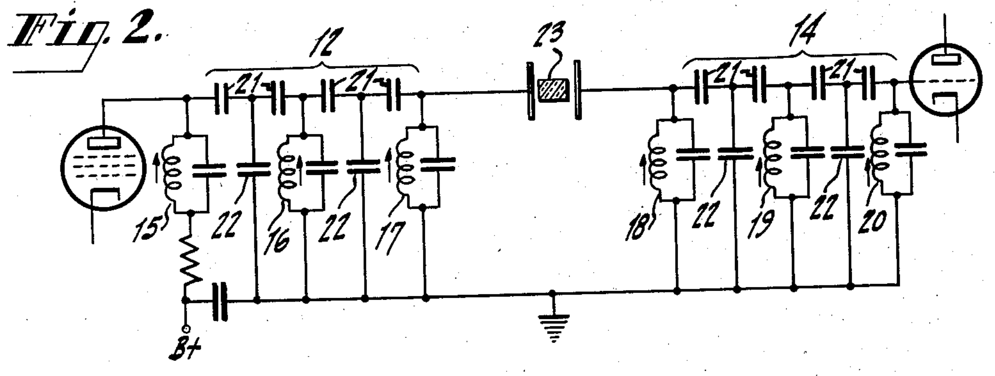
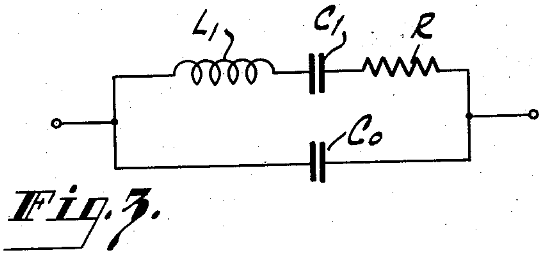
Fig. 3.
INVENTOR.
DANIEL HOCHMAN
BY J. L. Whittaker
ATTORNEY INVENTOR.
DANIEL HOCHMAN
BY J. C. Whittaker
ATTORNEY United States Patent Office 2,839,732

Patented June 17, 1958

2,839,732

SINGLE-SIDEBAND FILTER

Daniel Hochman, Haddonfield, N. J., assignor to Radio Corporation of America, a corporation of Delaware Application January 31, 1955, Serial No. 485,111

The terminal fifteen years of the term of the patent to be granted has been disclaimed 3 Claims. (Cl. 333—72)

The present invention relates to electrical wave filters and in particular to an improved single-sideband filter having a steep response characteristic on one side of the passband and a more gradually sloping response characteristic on the other side of the passband.

The requirements for a bandpass filter for single-sideband transmission are usually as follows:

(1) The response characteristic adjacent to the carrier frequency must be very selective in order to partially suppress the carrier (if desired) and fully suppress the unwanted sideband.

(2) The response characteristic remote from the carrier frequency is not critical, but in cases of multichannel systems should provide sufficient attenuation in the band of the neighboring channel to maintain the cross-talk below a predetermined level.

(3) The stability of the response, especially in the region adjacent to the carrier frequency, is very critical. Small frequency changes in this edge of the passband result in large changes in attenuation.

A conventional L.-C. (inductor-condenser) type filter cannot fill the above requirements for a number of reasons. In the first place, the response characteristic on the side thereof adjacent the carrier frequency cannot be obtained with a reasonable number of sections (six or less) due to limitations in practically reliable Q's of the coils. Secondly, the required stability of this part of the selectivity curve cannot be satisfied unless special and costly measures are undertaken in component design.

Conventional lattice or ladder type crystal filters do provide an amplitude response having a steep edge adjacent the carrier frequency. For example, a filter arrangement such as shown in Espenschied Patent No. 1,795,204, dated March 3, 1931, would produce a satisfactory bandpass configuration. However, this type of filter requires a crystal for each section of the filter. The price of such an arrangement would be prohibitive in some commercial applications. Moreover, the filter of the Espenschied patent provides an attenuation which rises very rapidly on both sides of the passband, that is, above and below the upper and lower cutoff frequencies respectively, whereas the single-sideband filter of the present invention requires a steep characteristic solely on the side of the bandpass characteristic adjacent to the carrier.

There are other crystal filters known in the art using a single crystal. Patent No. 2,308,258 to Armstrong et al., titled Band-Pass Filter Circuits, dated January 12, 1943, and Patent No. 2,218,087 to Goering, titled Crystal Filter of Variable Band Widths, dated October 15, 1940, are representative of arrangements which, while having some superficial resemblance to the embodiment of the instant invention, operate on a different principle. These prior filters are essentially constant K single $\pi$ structures in which the series element of the $\pi$ consists of a series resonant circuit. A crystal is employed in both cases to simulate the series resonant circuit and therefore its static capacity (which in the equivalent circuits connects across the series resonant circuit) must be neutralized. As shown in the Goering patent, the bandpass characteristic is symmetrical.

It is an object of the present invention to provide an improved bandpass filter suitable for single-sideband operation.

It is another object of the present invention to provide an improved single-sideband filter having a steep response characteristic on one side of the passband and a more gradually sloping response characteristic on the other side of the passband.

It is another object of the present invention to provide an improved single-sideband filter which is very stable on the side of the passband adjacent the carrier.

It is still another object of the invention to provide a single-sideband filter of high quality which is relatively inexpensive to construct.

The present invention employs the combination of an L.-C. filter and a crystal in which the advantages of both are utilized to produce the required single-sideband characteristic discussed above. The static capacity of the crystal is not compensated for or corrected but is employed to produce the very steep response required on the side of the passband adjacent the carrier.

According to preferred embodiments of the invention, an L.-C. filter having a passband defined by given upper and lower frequency limits is connected in series solely with a single piezoelectric crystal. The crystal has a series-resonant frequency close to the upper frequency limit of the passband and an antiresonant frequency slightly higher than the series-resonant frequency. The resultant response characteristic in the carrier region is substantially fully controlled by the crystal and has the selectivity and stability of the crystal response itself. Beyond the antiresonance frequency of the crystal the response exhibits a small side lobe which in turn is taken over by the L.-C. response characteristic. The attenuation on the low frequency side of the bandpass is the composite attenuation of the L.-C. filter and the crystal.

In the preferred form of the invention the filter consists of a six-section L.-C. filter divided into two stages of three sections each. The crystal is connected in series between the two stages and acts as a buffer stage and coupling impedance at the same time. The static capacity $C_0$ of the crystal is preferably substantially lower than the coupling capacity used in the L.-C. stages.

The invention will be described in greater detail by reference to the following description taken in connection with the accompanying drawing in which:

Figure 1 is a graph of the desired minimum requirements for the single-sideband filters of the present invention;

Figure 2 is a schematic circuit diagram of a typical embodiment of the present invention;

Figure 3 is an equivalent circuit diagram of the crystal shown in Figure 2;

Figure 4:
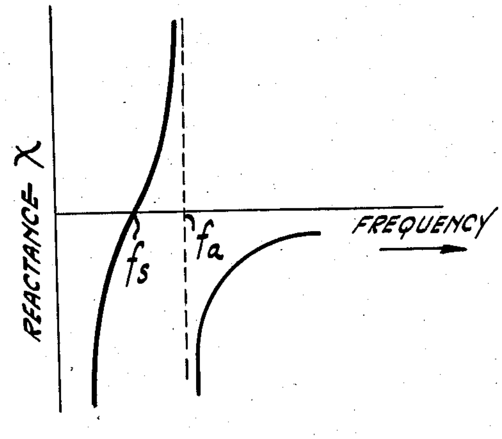
Figure 4 is a diagram of the variation in crystal reactance as a function of frequency.

Referring to the drawing and in particular to Figure 1, the required selectivity characteristic for the filter of the present invention is that the attenuation at the carrier frequency be at least 18 db. In the embodiment of the invention actually constructed the carrier frequency was 200 kc. (kilocycles). The edge of the passband is shown in Fig. 1 as beginning immediately below the 200 kc. point and intersecting the 200 kc. region at about 18 db. Above 200 kc. the steep rise of the selectivity curve can be modified slightly provided that the attenuation remains above 18 to 20 db. This accounts for the portion 10 of the curve. On the side of the response remote from the carrier frequency the attenuation rise may be at a substantially lower rate than on the side thereof adjacent the carrier frequency.

Referring now to Fig. 2, the filter of the present invention consists of six L.–C. filter sections divided into two stages 12, 14 of three sections each. Parallel tuned circuits 15–20, inclusive, are tunable as indicated by the arrows adjacent the coils of the tuned circuits. The parallel tuned circuits of each stage are coupled to one another by coupling capacitors 21, 22. Crystal 23 is connected in series between stages 12 and 14. The crystal acts as a buffer stage and coupling impedance.

The equivalent circuit of the crystal is shown in Fig. 3. It includes a first arm $L_1$, $C_1$, R and a second arm $C_0$ (the static capacity of the crystal). The crystal, thereof, has a series-resonant frequency and also an antiresonant frequency. The latter is determined by the uncompensated static capacity $C_0$ of the crystal and the effective inductance of the first arm above its series resonance. According to the present invention the antiresonant frequency of the crystal is made only several hundred cycles above its series-resonant frequency.

As shown in Fig. 4, the crystal, due to its very high Q, represents a very low resistance at its series-resonant frequency $f_s$ and a very high resistance at its antiresonant frequency $f_a$.

In a typical embodiment of the present invention the individual tuned circuits of Fig. 2 were resonated at the following frequencies:

| Circuit: | Kc. |
|---|---|
| **15** | 198.43 |
| **16** | 198.9 |
| **17** | 197.95 |
| **18** | 198.13 |
| **19** | 198.18 |
| **20** | 198.25 |

Figure 5:
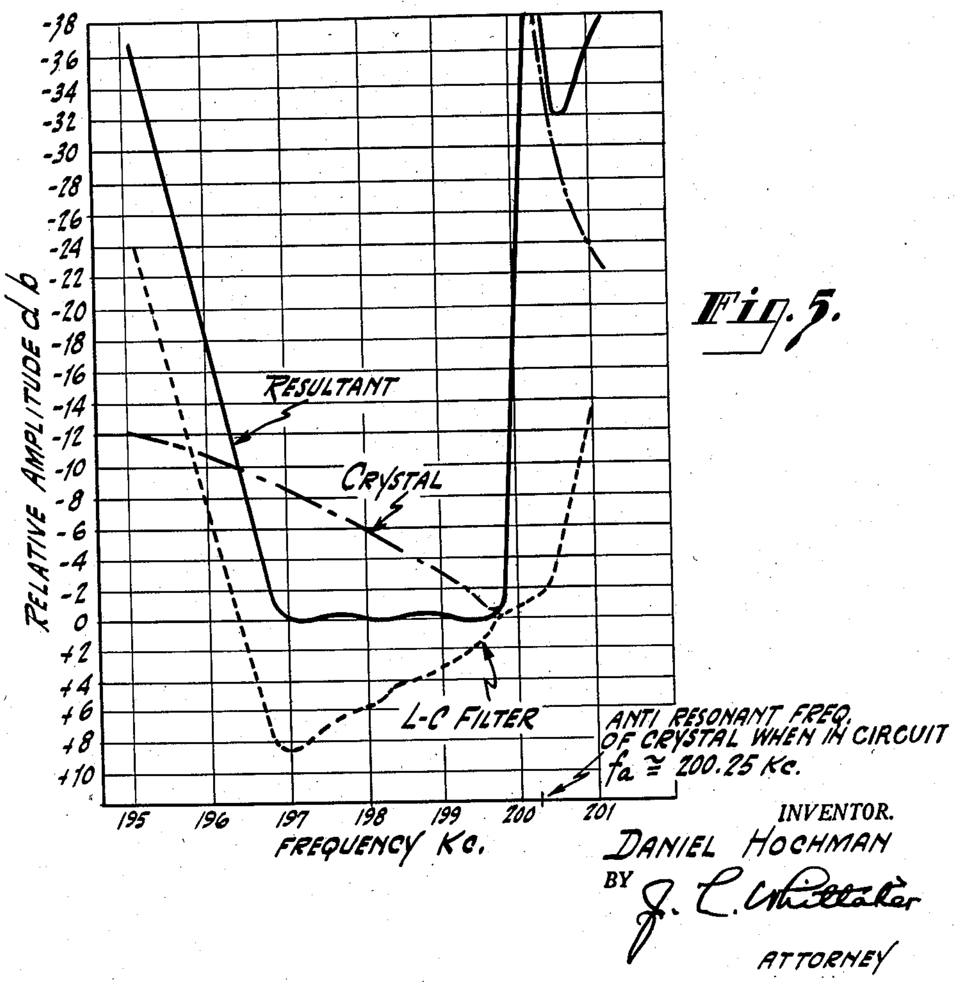
Figure 5 is a graph of the measured response of the filter shown in Figure 2.

Depending on the tolerances for the inductances and Qs of the coils employed, the above frequencies may vary somewhat from case to case. The resultant bandwidth of the L.–C. filter is about 4 kc. as shown in Fig. 5, even though the individual circuits are not tuned to that entire range. In this connection it should be remembered that ideally, a flat top, L.–C. filter is composed of resonant circuits tuned to the same frequency, i. e. the center frequency of the filter.

It is difficult to define the cut-off frequencies in terms of the 3 db down points of the L.–C. part of the filter because of the "tilted top" of the response (see the dashed line of Fig. 5). However, if the response were flat, the cut-off frequencies (3 db down) would lie roughly at 196.2 kc. and 200.3 kc.

In the above embodiment of the invention the carrier frequency was 200 kc. The series resonance of the crystal alone occurred at 199.6 kc. and its antiresonance occurred at about 200.15 kc. When the crystal is placed in the circuit, the effective capacitive component of the tuned circuits above their resonance shifts these series and antiresonance frequencies upward about 100 to 120 cycles.

Summarizing the above, the passband of the L.–C. portion of the filter is roughly 4 kc. wide, extending from about 196.2 kc. (lower cut-off frequency) to about 200.3 kc. (upper cut-off frequency). The series resonant frequency of the crystal when in the filter circuit is about 199.7 kc. and the antiresonant frequency of the crystal when in the circuit is about 200.25 kc. It is therefore seen that the upper cut-off frequency of the L.–C. filter is slightly higher than the antiresonant frequency of the filter. This is useful for it permits the L.–C. components to drift with temperature slightly up or down in frequency response without seriously affecting the upper limit of the passband response of the combined filter. This is because the edge of the passband adjacent the carrier is now determined solely by the crystal.

As shown in Fig. 5, the response of the filter is the product (sum of the logarithms (db scale)) of the L.–C. filter characteristic (the dashed curve) and the crystal characteristic (the dot-dash curve). It should be noted that the resultant response of the filter at the edge thereof adjacent the carrier frequency is given solely by the crystal and has the selectivity and stability of the crystal. Beyond the antiresonant frequency of the crystal the response exhibits a side lobe which in turn is taken over by the L.–C. response. It should be noted that since the side lobe is relatively small it has substantially no deleterious effect on the response of the filter. As a matter of fact, the response achieved is actually better than the minimum requirements shown in Fig. 1, since its high frequency edge rises even more steeply than the one of Fig. 1.

The static capacity $C_0$ of the crystal should be kept low—approximately ¼ of the coupling capacity used in the L.–C. stage. In an embodiment of the invention constructed this static capacity was made on the order of 3.5 $\mu\mu$f. The value of the static capacity also determines the difference between the series-resonant and antiresonant frequencies of the crystal. The larger $C_0$, the smaller the difference between these frequencies and the larger the magnitude of the side lobe.

What is claimed is:

1. A filter comprising a series arm and a pair of parallel arms, one on each side of said series arm, each of said parallel arms including a plurality of parallel tuned circuits capacitively coupled together, said parallel arms together providing a passband having a lower frequency limit and an upper frequency limit, and said filter including solely a single piezoelectric crystal, said crystal being in said series arm and having an antiresonant frequency within said passband immediately adjacent to said upper frequency limit and a series resonant frequency within said passband and slightly lower than said antiresonant frequency, and said piezoelectric crystal further having a static capacity that is substantially lower than the coupling capacity of said tuned circuits.

2. A filter as set forth in claim 1, wherein said static capacity is approximately one quarter of the value of said coupling capacitance.

3. A filter comprising a series arm and a pair of parallel arms, one on each side of said series arm, each said parallel arm including three parallel tuned circuits and capacitive elements coupling said parallel tuned circuits together, said two parallel arms together providing a passband having a lower cut-off frequency limit and an upper cut-off frequency limit, and said series arm including solely a single piezoelectric crystal having a static capacity which is approximately one quarter that of the coupling capacity between said parallel tuned circuits, and having an antiresonant frequency within said passband immediately adjacent said upper frequency limit, and a series resonant frequency within said passband and slightly lower than said antiresonant frequency.

References Cited in the file of this patent

UNITED STATES PATENTS 1,851,091 Fetter ---------------- Mar. 29, 1932